(12) United States Patent
Kai et al.

(10) Patent No.: US 12,509,710 B2
(45) Date of Patent: Dec. 30, 2025

(54) ENDOPHYTIC BACTERIAL STRAIN FOR PREPARING CAMPTOTHECIN AND PREPARATION METHOD OF CAMPTOTHECIN

(71) Applicant: ZHEJIANG CHINESE MEDICAL UNIVERSIYT, Zhejiang (CN)

(72) Inventors: Guoyin Kai, Hangzhou (CN); Yue Feng, Hangzhou (CN); Chao Huang, Hangzhou (CN)

(73) Assignee: ZHEJIANG CHINESE MEDICAL UNIVERSIYT, Hangzhou (CN)

( * ) Notice: Subject to any disclaimer, the term of this patent is extended or adjusted under 35 U.S.C. 154(b) by 456 days.

(21) Appl. No.: 18/079,005

(22) Filed: Dec. 12, 2022

(65) Prior Publication Data

US 2023/0295675 A1 Sep. 21, 2023

Related U.S. Application Data

(63) Continuation of application No. PCT/CN2021/134177, filed on Nov. 29, 2021.

(30) Foreign Application Priority Data

May 27, 2021 (CN) .......................... 202110585480.2

(51) Int. Cl.
  *C12P 17/18* (2006.01)
  *C12N 1/14* (2006.01)
  *C12R 1/66* (2006.01)

(52) U.S. Cl.
  CPC ............ *C12P 17/188* (2013.01); *C12N 1/145* (2021.05); *C12R 2001/66* (2021.05)

(58) Field of Classification Search
  None
  See application file for complete search history.

(56) References Cited

U.S. PATENT DOCUMENTS

2017/0150717 A1* 6/2017 Dubost ................ C07D 213/82

FOREIGN PATENT DOCUMENTS

| CN | 103074236 A | 5/2013 |
|----|---|---|
| CN | 112195105 A | 1/2021 |
| CN | 113278533 A | 8/2021 |
| WO | 2006067535 A1 | 6/2006 |
| WO | 2020044374 A1 | 3/2020 |

OTHER PUBLICATIONS

International Search Report (PCT/CN2021/134177); Date of Mailing: Mar. 3, 2022.
First Office Action(202110585480.2); Date of Mailing: Jan. 28, 2022.
Camptothecin-producing-endophytic-fungus-*Trichoderma-atroviride* LY357:isolation, identification, and-fermentation-conditions-optimization-for-camptothecin-production.
Sustainable-production-of-camptothecin-from-an-Alternariasp. isolated-from-Nothapodytes-nimmoniana.
Isolation-and-identification-of-a-camptothecin-producing-endophytic-fungus-from-*Camptotheca-acuminate*.
Isolation, Attenuation, and-Secondary-Metabolites-of-Attenuated-Camptothecin-producing-Endophytic-Fungus-*Aspergillus*-sp. LY013-from-Camptotheca-acuminata.

* cited by examiner

Primary Examiner — Christian L Fronda
(74) Attorney, Agent, or Firm — Wiersch Law Group

(57) ABSTRACT

The present application provides an endophytic bacterial strain with a high camptothecin yield, which is *Alternaria temuissima* ZCMUKL-S1, deposited as CCTCC NO: M2021189, or *Alternaria citricancri* ZCMUKL-S2, deposited as CCTCC NO: M2021190, or *Aspergillus versicolor* ZCMUKL-S3, deposited as CCTCC NO: M2021191. The endophytic bacterial strain has a high yield of camptothecin, wherein the yield of camptothecin per unit dry mycelium powder of *Aspergillus versicolor* ZCMUKL-S3 is as high as 116 μg/g, which is the highest yield of camptothecin produced by endophytic bacterial strains reported at present, and has potential application value for its industrial production. In addition, the endophytic bacterial strain which can produce high camptothecin provided by the present application has good genetic stability.

6 Claims, 4 Drawing Sheets

Specification includes a Sequence Listing.

ENDOPHYTIC BACTERIAL STRAIN FOR PREPARING CAMPTOTHECIN AND PREPARATION METHOD OF CAMPTOTHECIN

REFERENCE TO SEQUENCE LISTING

The present application is being filed along with a Sequence Listing in electronic format. The Sequence Listing is provided as a file entitled DF222406US-SEQUENCE LISTING ST.26, created on Apr. 26, 2023, which is approximately 2.84 KB in size. The information in the electronic format of the Sequence Listing is incorporated herein by reference in its entirety.

TECHNICAL FIELD

The application relates to an endophytic bacterial strain capable of producing camptothecin, belonging to the research field of medicinal plant endophytes.

BACKGROUND

Camptothecin is a monoterpene indole alkaloid with a unique topoisomerase I inhibitory effect, so it has a unique inhibitory activity against cancers. A variety of camptothecin anti-tumor drugs with good efficacy, small side effects and good solubility have been screened out and applied clinically, and they are the third largest plant anti-cancer drugs.

Camptothecin can be biosynthesized by medicinal plants such as *Camptotheca acuminata* and *Ophiorrhiza japonica* B1. *Camptotheca acuminata* is the main source, but its content is still low, and it is very difficult to extract it directly from *Camptotheca acuminata*, which can no longer meet the great demand of medical market. Therefore, it is of great significance to obtain alternative sources for camptothecin production.

Endophytic fungi are filamentous fungi parasitic in plant tissues. During the long-term evolution, some endophytes have established reciprocal symbiotic relationship with their host plants: endophytes absorb nutrients from plants, and their secondary metabolites can regulate the immune system of plants, promote the growth of plants, and increase the tolerance of plants to diseases or abiotic stresses such as temperature, pH and heavy metals. At the same time, the exchange of genetic materials may occur between endophytes and plants, and endophytes can partially or completely synthesize the same active components as the host. In addition, endophytic fungi isolated from *Camptotheca acuminata* are expected to be a potential source of high-yield camptothecin because of their low culture cost, rapid growth and short fermentation period.

In the process of producing medicinal components by endophytes, the characteristics of poor genetic stability limit their industrial application. Therefore, it is of great significance to obtain camptothecin-producing endophytic bacterial strains with stable inheritance.

SUMMARY

The first problem to be solved by the present application is to provide an endophytic bacterial strain which can efficiently produce camptothecin. The strain was isolated from *Camptotheca acuminata* seeds. After isolation and identification, it is confirmed that the endophytic bacterial strain with a high camptothecin yield is:

*Alternaria tenuissima* ZCMUKL-S1, which is deposited as CCTCC NO: M2021189 on Feb. 23, 2021 in China Center for Typical Culture Collection; or

*Alternaria citricancri* ZCMUKL-S2, which is deposited as CCTCC NO: M2021190 on Feb. 23, 2021 in China Center for Typical Culture Collection; or

*Aspergillus versicolor* ZCMUKL-S3, which is deposited as CCTCC NO: M2021191 on Feb. 23, 2021 in China Center for Typical Culture Collection.

The present application further provides use of the endophytic bacterial strain with a high camptothecin yield in the preparation of camptothecin.

Further, the preparation of camptothecin is realized by the following steps:
(1) selecting fungal spores of the endophytic bacterial strain with a high camptothecin yield, washing the fungal spores with sterile saline, and filtering to prepare a spore suspension;
(2) inoculating the pore suspension into a potato glucose agar medium for culture, and then collecting a supernatant and separating to obtain camptothecin.

Further, a concentration of the pore suspension is $6.0 \times 10^6$ spores/mL.

Further, a volume ratio of the spore suspension to the potato glucose agar medium is 1:100.

Further, a formula of the potato glucose agar medium is: 200 g/L potato, 20 g/L glucose and 15 g/L agar.

Further, in step 2, the culture conditions are: 25° C., 150 rpm, and a culture time of 7 days.

The application has the beneficial effects that: the endophytic bacterial strain with a high camptothecin yield provided by the present application has a high camptothecin yield, wherein the yield of camptothecin per unit dry mycelium powder of *Aspergillus versicolor* ZCMUKL-S3 is as high as 116 µg/g, which is the highest yield of camptothecin produced by endophytes reported at present, and has potential application value for its industrial production. In addition, the endophytic bacterial strain with a high camptothecin yield provided by the present application has good genetic stability, and can still maintain 80% of the initial yield after 10 generations of passage.

DESCRIPTION OF EMBODIMENTS

Example 1 Isolation of Endophytic Fungi from *Camptotheca acuminata* Seeds

First, *Camptotheca acuminata* seeds were washed with tap water overnight. Then, the seeds were washed with 75% (v/v) ethanol for 3 minutes, washed with sterile water for 5 times, disinfected with 50% (v/v) sodium hypochlorite for 5 minutes, washed with sterile water again for 5 times for surface disinfection, and finally dried on sterile filter paper. Then, the sterilized *Camptotheca acuminata* seeds were cut to a size of 2 mm, placed on a PDA culture medium, cultured at 25° C. for 5-10 days, and purified regularly to obtain three single colonies S1, S2 and S3.

Example 2 Colony Morphology Analysis of S1, S2 and S3 Single Colonies

Identification of endophytic fungi by a morphological method.

Figure 1:
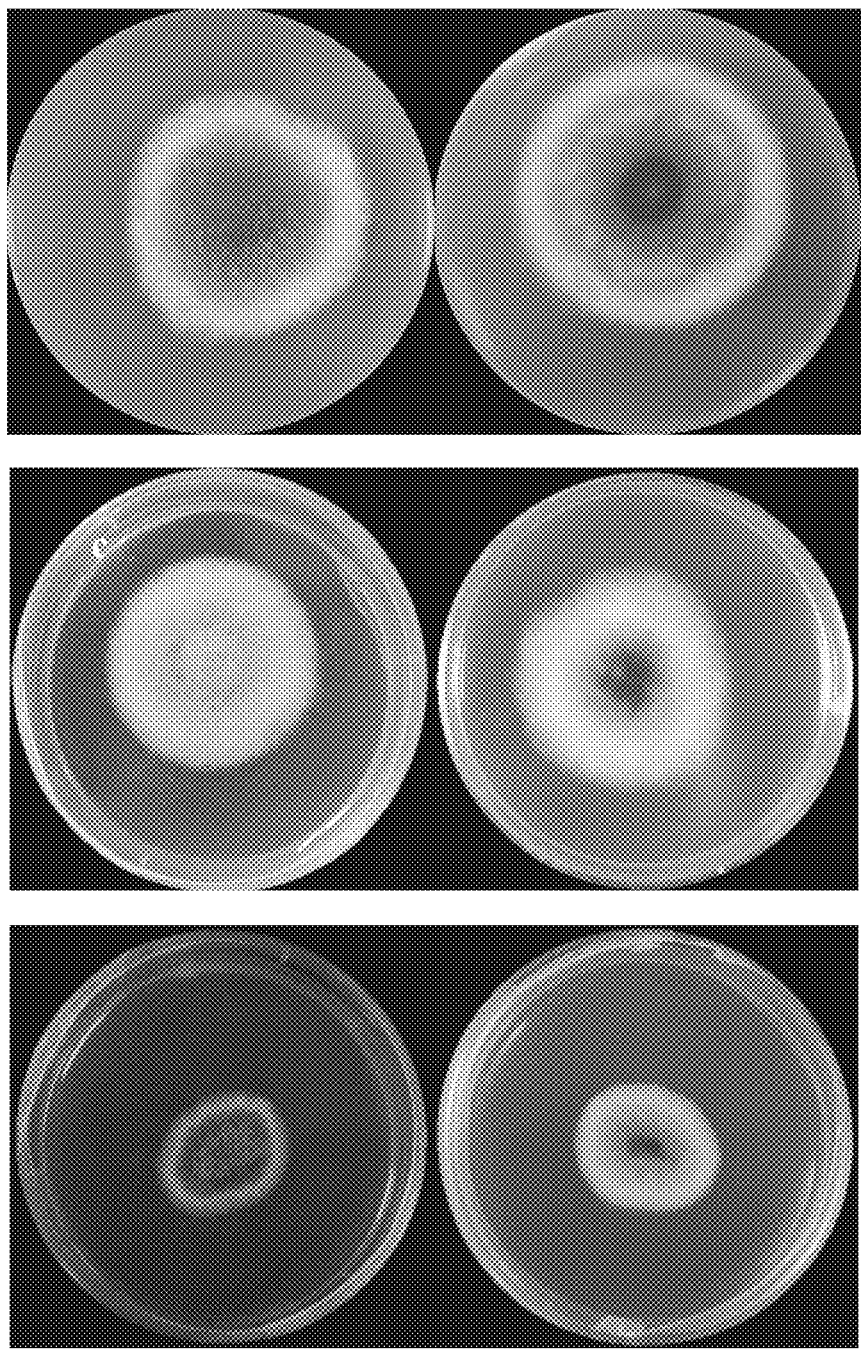
FIG. 1 shows the colony morphology of camptothecin-producing endophytes, in which A is a strain S1, B is a strain S2 and C is a strain S3.

As shown in FIG. 1, the morphology of the S1 colony was as follows: the primary hyphae were white, the aerial hyphae were well developed; with the extension of culture time, the center of the colony was dark green, the reverse side of the colony was brownish yellow, the texture of the colony was fluffy, the edge of the colony was irregular, and there was no exudate.

The morphology of the S2 colony was as follows: the primary hyphae was white, the texture of the colony was fluffy, and the center of the colony was black.

The morphology of the S3 colony was as follows: at the initial stage of culture, it was white and round, with smooth edges, dry surface and rapid growth; the colony was in a radial groove, surrounded by white hyphae in the middle, and was grayish green; after 4-5 days, the back of the colony appeared yellow (FIG. 1).

Example 3 Microscopic Identification of Camptothecin-producing Endophytic Fungi S1, S2 and S3

Figure 2:
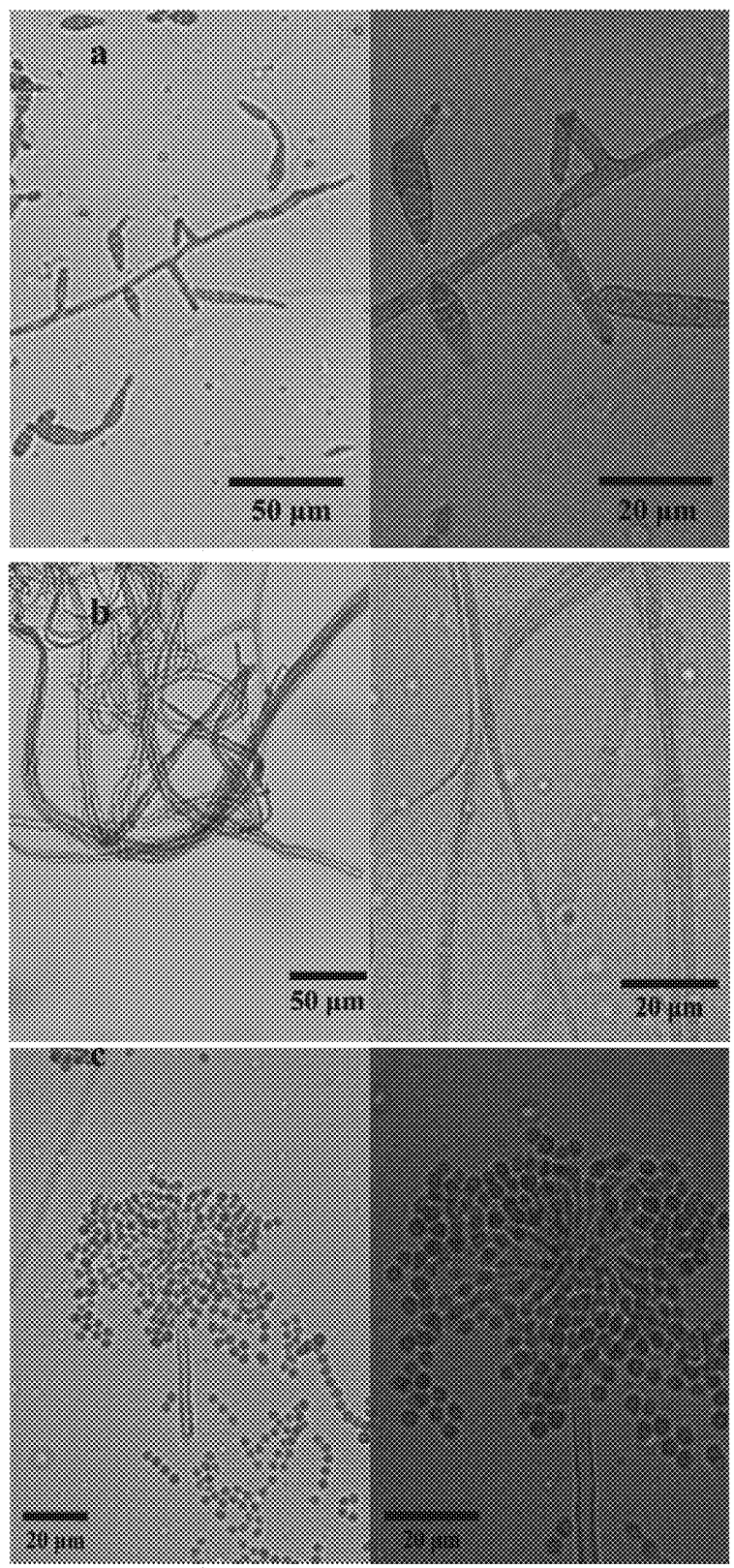
FIG. 2 shows the electron microscope images of camptothecin-producing endophytes at different magnifications, in which A is a strain S1, B is a strain S2 and C is a strain S3.

The isolated strains were stained with lactophenol cotton blue, and the morphology was observed under microscope. Microscopic analysis as shown in FIG. 2 showed that vegetative hyphae of S1 strain were composed of branched hyphae with transverse septa, with thin filaments, and conidiophore emerged from hyphae, standing upright and short; conidia were formed at the top, which were mostly solitary, rarely solitary, with obvious transverse septa and mediastinum. The mycelium of the strain S2 was filamentous and transparent; there were fewer conidia and more solitary ones. The conidia of the strain S3 had few branches, with radial ends and nearly spherical tops, green spores were produced, and the spores were ovoid; the conidia wall was smooth and the hyphae were transparent.

Figure 3:
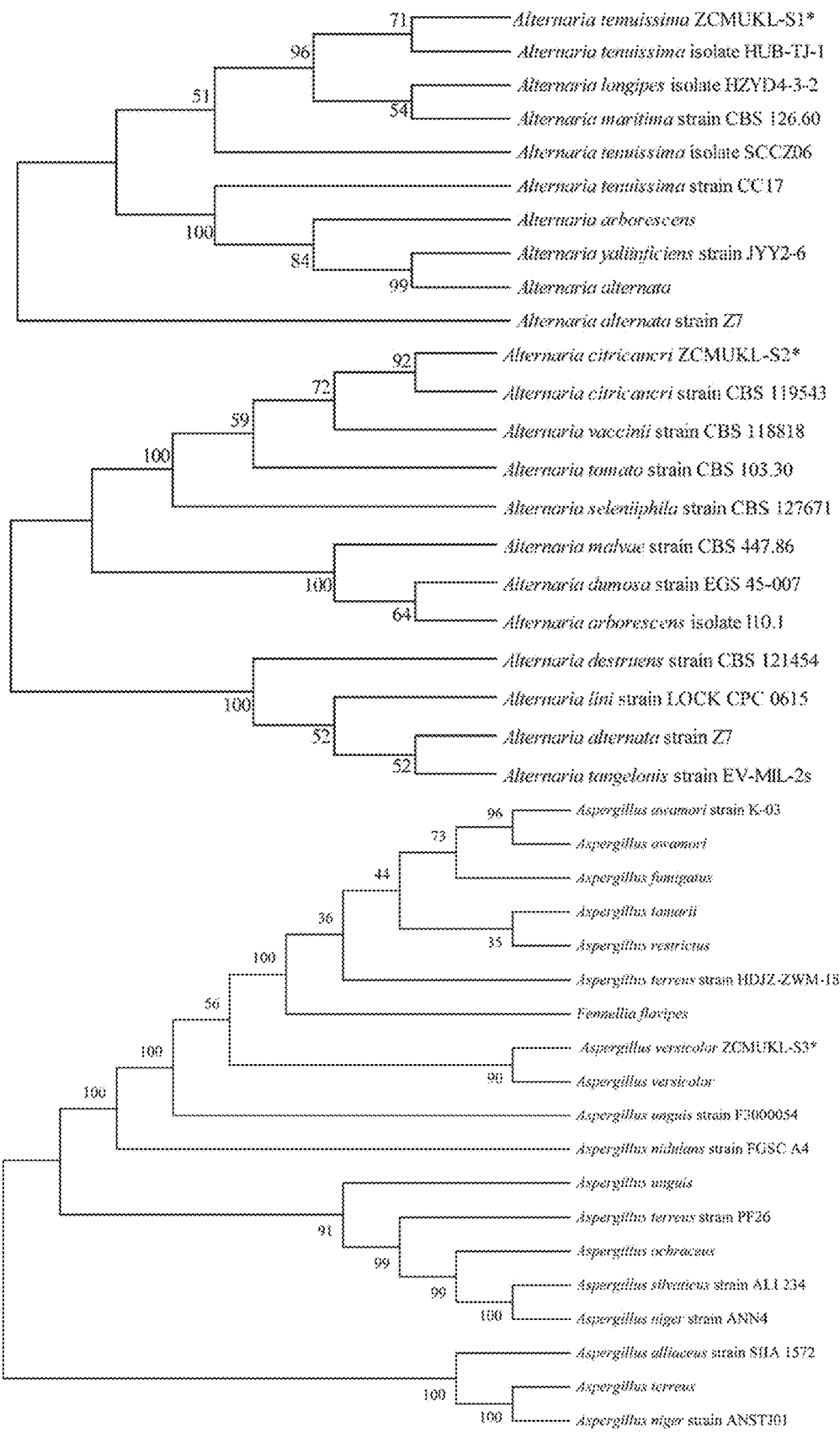
FIG. 3 shows the evolutionary relationship of camptothecin-producing endophytes S1, S2 and S3.

Example 4 Molecular Biological Identification of Camptothecin-Producing Endophytic Fungi The genomic DNAs of the fungi were extracted by a CTAB method and classified according to their 18s sequences. P1 (5'-GTAGTCATTGCTTGTCTC-3', SEQ ID NO. 1) and P2 (5'-TCCGCAGTTCACCCTACGGA-3', SEQ ID NO. 2) were used as primers and genomic DNAs were used as a template to amplify the 18s sequences. The PCR reaction conditions were: 94° C. 5 min, 30 cycles (98° C. 15s, 55° C. 15s, 72° C. 120s), 72° C. 10 min. The PCR system: a template 1 µL, upstream and downstream primers p1 and p2, each of which was 1 µL, dNTP Mix 4 µL, 5×primeSTAR Buffer 10 µL, sterilized double distilled water 32.5 µL, primeSTAR DNA polymerase 0.5 µl. A gel recovery kit was used to purify and recover PCR products. The sequences were compared with the sequences in GenBank database by sequencing. The phylogenetic tree analysis results are shown in FIG. 3. The 18s sequence of S1 is highly similar to *Alternaria tenuissima*; the 18s sequence of S2 was similar to *Alternaria citricancri*; the 18s sequence of S3 was similar to *Aspergillus versicolor*.

The endophytic bacterial strain S1 of the present application was classified and named *Alternaria tenuissima* ZCMUKL-S1, which is deposited as CCTCC NO: M2021189 on Feb. 23, 2021 in China Center for Typical Culture Collection (CCTCC) located in Wuhan University, Wuhan, China, with the zip code of 430072; the endophytic bacterial strain S2 of the present application is classified and named which is deposited as CCTCC NO: M2021190 on Feb. 23, 2021 in China Center for Typical Culture Collection located in Wuhan University, Wuhan, China, with the zip code of 430072; the endophytic bacterial strain S3 of the present application is classified and named *Aspergillus versicolor* ZCMUKL-S3, which is deposited as CCTCC NO: M2021191 on Feb. 23, 2021 in China Center for Typical Culture Collection located in Wuhan University, Wuhan, China, with the zip code of 430072.

Example 5: Cultivation of Endophytic Fungi

The fungal spores of S1, S2 and S3 grown on PDA medium were washed with 50 mL sterile saline and filtered with sterile gauze to prepare S1, S2 and S3 spore suspensions. 1 mL of the spore suspension ($6.0 \times 10^6$ spores/mL) was inoculated into a 100 mL PDA liquid medium for camptothecin production. After culturing at 25° C. and 150 rpm for 7 days, the mycelium was centrifuged at 9000×g 5 min, and its dry weight was determined after freeze-drying. The camptothecin content was determined by HPLC.

Example 6: Production Detection of Endophytic Bacterial Strain Camptothecin (1) To detect camptothecin in the mycelia, the mycelia cultured for 7 days were collected by centrifugation and dried to a constant weight in 60° C. oven. 0.3 g of the dried mycelium powder was weighed and resuspended in 40 ml of a solution of dichloromethane and methanol (volume ratio 4:1), and was then subjected to ultrasonic extraction for 10 min to obtain a uniform suspension. The supernatant was collected, dried by rotary evaporation and redissolved in 1 mL of a solution of DMSO and methanol (volume ratio 1:50). The content of camptothecin in the endophytic mycelia was detected by HPLC.

(2) HPLC column specifications: C-18 reversed-phase silica gel stainless steel column, ZORBAX SB-C18, with a particle size of 5 µm, and a specification of 4.6×150 mm; sample volume: 10 µL; column temperature: 30° C.; flow rate: 1 mL/min; (2) mobile phase and detection wavelength: the mobile phase of camptothecin: chromatographic pure acetonitrile: water=35:65 (V:V); detection wavelength: 254 nm.

Upon detection and analysis, S1 could produce about 2.3 µg/g camptothecin, S2 could produce about 242 ng/g camptothecin, and S3 could produce about 116 µg/g camptothecin. Among them, the yield of S3 was the highest reported yield of camptothecin produced by endophytes, which has potential application value for its industrial production.

Example 7 Evaluation of Genetic Stability of Camptothecin-producing Endophyte S3

Figure 4:
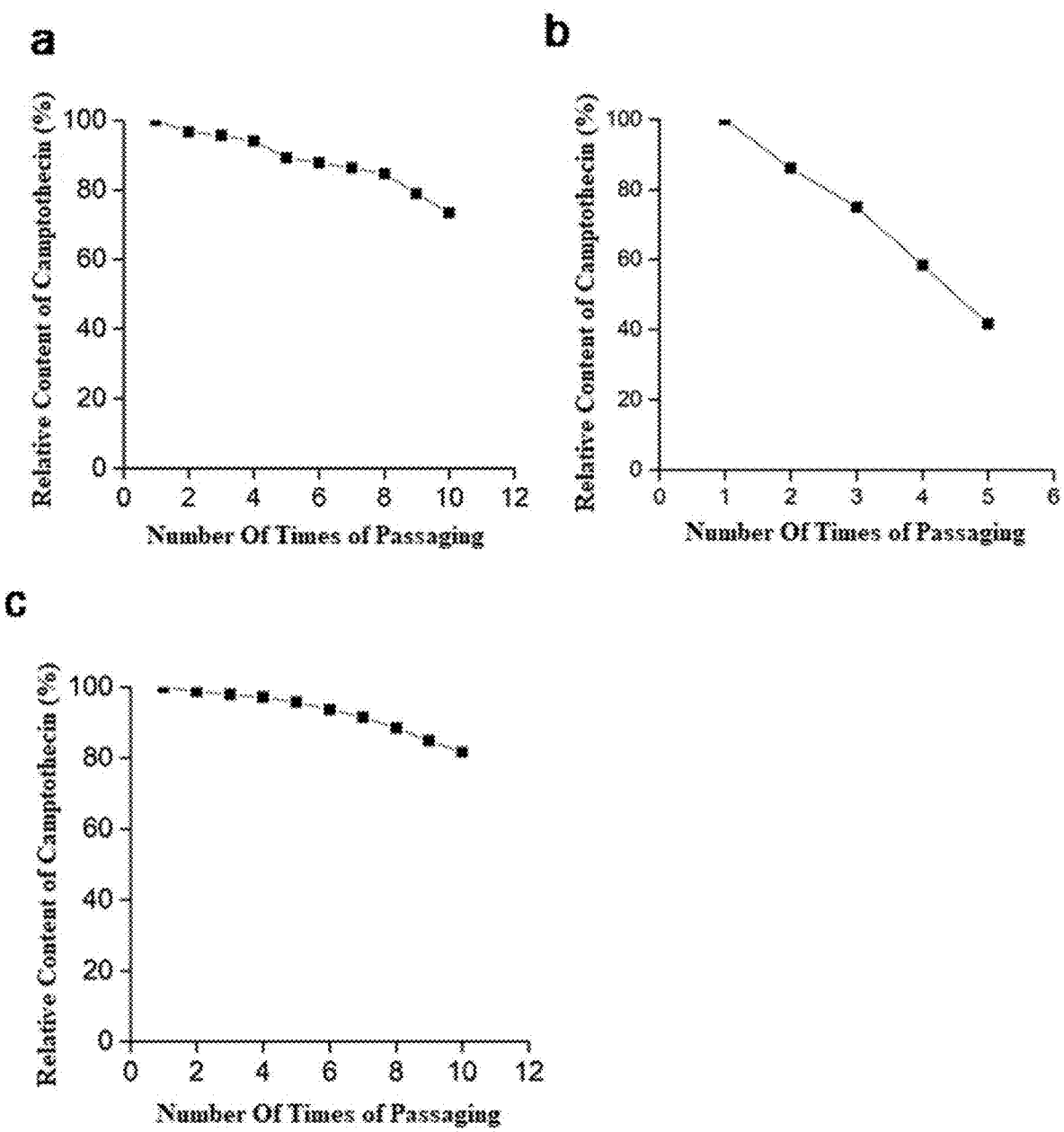
FIG. 4 shows the results of HPLC detection of camptothecin content in endophytes of different generations, in which A is a strain S1, B is a strain S2 and C is a strain S3.

The above S1, S2, S3 strains were inoculated into a PDA solid medium, and subcultured for 10 generations, respectively. The growth performance and morphology of the strains were observed, and it was found that there was no obvious difference in the growth performance and morphology of various generations. Subsequently, the strains of each generation were inoculated into a PDA liquid medium for fermentation culture, and the camptothecin content of each generation was detected. It was found that the camptothecin content of each generation decreased only slightly, which indicated that S1, S2 and S3 strains had good genetic stability (FIG. 4). Among them, S1 strain could still maintain more than 65% of the initial yield after 10 generations, and S3 strain could still maintain about 80% of the initial yield after 10 generations.

Although the present application has been disclosed in the preferred embodiment, it is not intended to limit the present application. Anyone who is familiar with this technology can make various changes and modifications without departing from the spirit and scope of the present application. Therefore, the scope of protection of the present application shall be defined by the claims.

What is claimed is:

1. An endophytic bacterial strain for preparing camptothecin, wherein the endophytic bacterial strain is:

*Alternaria tenuissima* ZCMUKL-S1, which has been deposited with an accession number of CCTCC NO: M2021189 on Feb. 23, 2021 in China Center for Typical Culture Collection; or

*Alternaria citricancri* ZCMUKL-S2, which has been deposited with an accession number of CCTCC NO: M2021190 on Feb. 23, 2021 in China Center for Typical Culture Collection; or

*Aspergillus versicolor* ZCMUKL-S3, which has been deposited with an accession number of CCTCC NO: M2021191 on Feb. 23, 2021 in China Center for Typical Culture Collection.

2. A preparation method of camptothecin by using the endophytic bacterial strain according to claim 1, comprising:

(1) selecting fungal spores of the endophytic bacterial strain, washing the fungal spores with sterile saline, and filtering to prepare a spore suspension; and (2) inoculating the pore suspension into a potato glucose agar medium for culture, and collecting a supernatant and separating to obtain camptothecin.

3. The preparation method according to claim 2, wherein in step 1, a concentration of the pore suspension is $6.0 \times 10^6$ spores/mL.

4. The preparation method according to claim 3, wherein in step 1, a volume ratio of the spore suspension to the potato glucose agar medium is 1:100.

5. The preparation method according to claim 2, wherein a formula of the potato glucose agar medium is: 200 g/L potato, 20 g/L glucose and 15 g/L agar.

6. The preparation method according to claim 2, wherein in step 2, the culture conditions are: 25° C., 150 rpm, and a culture time of 7 days.

* * * * *

SEQUENCE LISTING

```
Sequence total quantity: 2
SEQ ID NO: 1            moltype = DNA  length = 19
FEATURE                 Location/Qualifiers
source                  1..19
                        mol_type = other DNA
                        organism = synthetic construct
SEQUENCE: 1
gtagtcatat gcttgtctc                                                  19

SEQ ID NO: 2            moltype = DNA  length = 20
FEATURE                 Location/Qualifiers
source                  1..20
                        mol_type = other DNA
                        organism = synthetic construct
SEQUENCE: 2
tccgcaggtt cacctacgga                                                 20
```